No. 742,453.

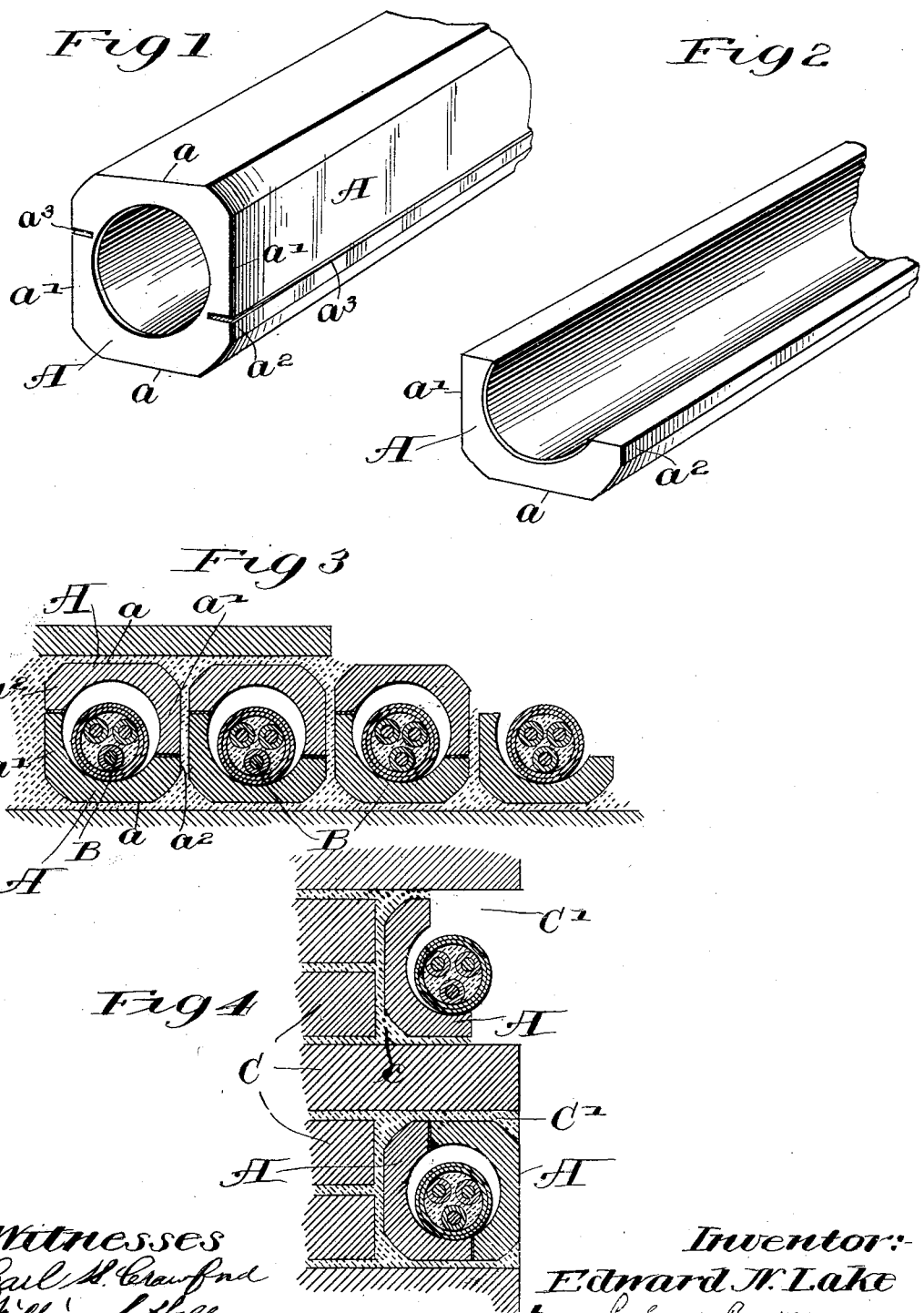

Patented October 27, 1903.

UNITED STATES PATENT OFFICE.

EDWARD N. LAKE, OF CHICAGO, ILLINOIS.

SPLIT ELECTRICAL CONDUIT.

SPECIFICATION forming part of Letters Patent No. 742,453, dated October 27, 1903.

Application filed April 25, 1903. Serial No. 154,267. (No model.)

*To all whom it may concern:*

Be it known that I, EDWARD N. LAKE, of Chicago, in the county of Cook and State of Illinois, have invented certain new and useful Improvements in Split Electrical Conduits; and I do hereby declare that the following is a full, clear, and exact description thereof, reference being had to the accompanying drawings, and to the letters of reference marked thereon, which form a part of this specification.

This invention relates to improvements in split conduits for electrical conducting-cables; and among the objects of the invention are to render more nearly perfect the isolation of cables carrying high-tension currents in such conduits and to facilitate the installation of such conduits and cables. Such conduits are usually formed from plastic earthenware and baked to give permanency of form thereto.

The invention consists in the matters hereinafter set forth, and more particularly pointed out in the appended claims.

As shown in the drawings, Figure 1 is a perspective view of a section of conduit made in accordance with my invention. Fig. 2 is a perspective view of a longitudinally-divided half of the conduit. Fig. 3 illustrates the application of my improvement to floor-conduits which are adapted to be laid in floor-trenches of an electric station or in the bottom of manholes, tunnels, and like places. Fig. 4 illustrates the manner of applying my improved conduit to the walls of tunnels and like places.

A conduit made in accordance with my invention is split or scored longitudinally in its opposite walls along lines of division located out of line with respect to each other.

In the several figures of the drawings, A A designate the two halves of a conduit made in accordance with my invention, said halves embracing one side wall $a$ of the conduit, the greater part of one of the adjacent side walls $a'$, and the lesser part of the other adjacent wall $a^2$, the two halves or parts of the conduit being made of substantially the same size and dimensions. As a result of this construction when the two halves of the conduit are assembled the joints are offset or out of line with respect to each other.

In manufacturing my improved conduit the knives or scoring devices which mark the longitudinal score-grooves $a^3$ thereof are set in offset relation or out of line with respect to each other as the conduits are passed through the molding or forming machine, so as to produce the offset or staggered score-grooves. When the conduit is manufactured, the knives or scoring devices do not extend entirely through the walls of the conduit, and therefore do not sever said walls, it being the purpose to leave sufficient material at the inner sides of said walls at each line of juncture to hold the parts of the conduits together during transportation and until the time said conduits are to be used. At the time of use the parts of the conduits may be separated by a slight blow from a suitable instrument sufficient to break the unsevered portions thereof, so that each half of the conduit consists of one entire side wall, the greater part of one of the adjacent walls, and the lesser part of the other adjacent wall, as before described.

In Fig. 3 I have shown my improved conduit as applied to contain the electrical conducting-cables B in a floor structure of a generating-station, manholes, tunnels, and the like. The conduits are usually laid in cement side by side in parallel relation on the same level and are for the sake of economy of space usually located close together. They may be laid one tier over another. It has been common heretofore in making such conduits to divide the conduit in opposing walls along lines of division diametrically opposite to each other, so that each part consists of one wall and two halves of the two adjacent walls. It often occurs by reason of improper insulation between a number of cables contained in such conduits or between a number of wires of a single multiphase conducting-cable that a short circuit is formed between such insulated wires, resulting in a powerful arc which works disastrous results on adjacent cables which are not properly isolated therefrom. It becomes very important therefore that such cables be properly isolated from each other in order that such casualties may be confined to the cable or cables in which the fault originated. In the use of the prior construction mentioned when the conduits were employed to contain cables embedded in the floor of a station or other place above mentioned and the conduits are located closely adjacent to each other it has been a common practice to lay the conduits with the joints between the parts of the conduits (which are closed by a suitable cement of less durable and less refractory material than that composing the conduits) located in line with and closely adjacent to each other. In the use of such conduits arranged as described when an arc is formed between the wires of a single cable or the wires of two or more cables contained in a conduit the cement joints of such conduit are the first to give way, because they afford the least resistance to the force of the arc. If under these circumstances the joints of adjacent walls of adjoining conduits be located in alinement with each other, the deterioration of the joint in one conduit will result in the attack by the enormous heat of the arc of the sound joint of an adjoining conduit, with the result of burning out such sound joint and disabling the cable or cables contained in such adjoining conduit. If it be attempted to arrange the conduits of the prior construction mentioned so that the joints of one conduit are located in the vertical walls thereof and the joints of adjoining conduits be located in the horizontal walls, and thus be out of alinement, the first halves of the vertically-divided conduits laid will not afford a support for the cables while the remaining halves are being fitted thereto, because the lower halves of the walls of such vertically-divided conduits are too short to constitute the necessary support for said cables at the time mentioned.

By the use of my novel conduit it will be seen that the joint of each conduit is located out of line with the joints of the adjacent walls of the adjoining conduits, so that in case a joint of one of the conduits becomes deteriorated or burned out in the manner before stated the heat of the arc is not thrown upon the sound joint of an adjoining, but upon the highly refractory vitrified wall thereof, which is ordinarily capable of withstanding the effects of such arcs. As a result the joints of said adjoining conduits are not endangered and the conducting-cables in such adjoining conduits are protected. By the use of my improved conduit the longitudinal joints are located out of line and the installation of the conduits is facilitated, because of the fact that the first halves of the conduit-sections laid afford ample support for the cables while the second or remaining halves of such conduits are being fitted in place. Another advantage of this form of conduit over the form of conduit made under the present practice is that the conduit may be more readily applied to cables already laid, for the reason that the short walls $a'$ of the conduit-section enable the section to be easily inserted beneath and above such laid cables.

In Fig. 4 is shown the application of my improved conduit to the vertical walls of a building, manhole, tunnel, or the like. Said walls are shown as made up of a plurality of bricks or tiles C, which are laid to provide channels C' to receive the conduits. In this use of the conduits the offset joints are formed vertically in the opposite horizontal walls thereof. In applying this form of conduit to the longitudinal channels in said wall a body of cement $c$ is first applied to the inner part of said channel and the inner halves of the conduits—to wit, the parts containing the greater parts $a'$ of the lower walls of the conduits are first inserted thereinto, as shown in the upper part of said Fig. 3. Thereafter the cable is laid in the line of conduits, (if it be an original installation of the cable,) after which the remaining or outer lateral parts of the conduits are cemented and inserted into place. It will be observed that the greater parts $a'$ of the divided walls of the conduits inserted into place provide at the lower parts thereof a support to receive and hold in place the cable C while the outer parts of the conduits are being fitted in place. If the conduits be divided on diametrically opposite lines in the upper and lower walls thereof and be inserted into the wall-channels in the manner described, the first or inner halves of the conduits inserted into the wall would afford no support or ledge at their lower sides for the cable or cables while the other parts of the conduits are inserted in place, such as herein shown. On the other hand, if such conduits be divided on diametrically opposite horizontal lines in the vertical or side walls thereof it is an exceedingly difficult matter after the lower halves of the conduits are in place and the cables laid therein to insert the upper halves of the conduits laterally into the channels and properly cement the same on all sides thereof. By the use of my novel form of conduit no difficulty attends the proper application of the cement between the inner parts of the channels and the inner halves of the conduits and the space between the channel-walls and the outer or last applied halves of the conduit is readily accessible of the proper application of the setting cement to the conduit and channel, thereby facilitating the placing of said outer parts of the conduit. The same advantages accrue as above described when applying my improved form of conduit to cables already laid, as in this instance it is equally desirable that the cables be properly supported in the first parts of the conduits inserted into the channels while the second parts are being inserted into place.

I claim as my invention—

1. A uniduct conduit for electrical conducting-cables provided in two opposing walls with longitudinal score-grooves along which the conduit is divided and which are coextensive in length with the conduit, said score-grooves being located out of line with respect to each other and so disposed that when the conduit is divided along said grooves the two parts of the conduit embrace approximately equal parts of the bore of the conduit.

2. A uniduct conduit for electrical conducting-cables provided in two opposing walls with longitudinal score-grooves which are coextensive in length with the length of the conduit, said score-grooves being located out of line with respect to each other, and so disposed as to divide the conduit into two parts of substantially like dimensions and cross-sections.

3. A plurality of uniduct conduits for electrical conducting-cables located side by side, each conduit being made of two substantially identical longitudinal sections which are joined along longitudinal lines of juncture located in two opposing walls of the conduit and staggered with respect to each other and coextensive with said conduit, the lines of juncture of adjacent walls of adjoining conduits being located out of line with respect to each other.

In testimony that I claim the foregoing as my invention I affix my signature, in presence of two witnesses, this 4th day of April, A. D. 1903.

EDWARD N. LAKE.

Witnesses:
WILLIAM L. HALL,
GERTRUDE BRYCE.